United States Patent
Miretsky et al.

(10) Patent No.: US 6,647,462 B1
(45) Date of Patent: Nov. 11, 2003

(54) APPARATUS AND A METHOD FOR PROVIDING DECODED INFORMATION

(75) Inventors: Alexander Miretsky, Haifa (IL); Vitaly Sukonik, Katsir (IL); Amit Dor, Ramat Gan (IL); Rami Natan, Ramat Gan (IL)

(73) Assignee: Motorola, Inc., Schaumburg, IL (US)

( * ) Notice: Subject to any disclaimer, the term of this patent is extended or adjusted under 35 U.S.C. 154(b) by 268 days.

(21) Appl. No.: 09/607,564

(22) Filed: Jun. 29, 2000

(51) Int. Cl.[7] .......................... G06F 12/00; G06F 13/00
(52) U.S. Cl. .......................... 711/118; 710/68; 712/210
(58) Field of Search ................. 712/205, 206, 712/208, 210, 215, 216; 710/29, 68; 711/118, 141, 202

(56) References Cited

U.S. PATENT DOCUMENTS

| | | | |
|---|---|---|---|
| 5,485,609 A | 1/1996 | Vitter et al. | 395/600 |
| 5,870,576 A * | 2/1999 | Faraboschi et al. | 712/210 |
| 5,915,262 A | 6/1999 | Bridgers et al. | 711/143 |
| 6,237,083 B1 * | 5/2001 | Favor | 712/217 |
| 6,367,001 B1 * | 4/2002 | Witt | 712/205 |
| 6,381,689 B2 * | 4/2002 | Witt et al. | 712/215 |

FOREIGN PATENT DOCUMENTS

EP 0957428 A2 11/1999

* cited by examiner

*Primary Examiner*—Reginald G. Bragdon
*Assistant Examiner*—Pierre M. Vital

(57) ABSTRACT

An apparatus and a method for providing decoded information, the apparatus comprising: a memory module for storing encoded information; a decoder, coupled to the memory module, for fetching and decoding encoded information and for providing decoded information; and a cache, coupled to the memory module and to the decoder and to a recipient of decoded information, the cache is adapted to store at least one set of decoded information, to be provided to the recipient of information after a cache check condition is fulfilled and a cache hit occurs. A cache check condition is fulfilled when a change of flow occurs.

21 Claims, 5 Drawing Sheets

APPARATUS AND A METHOD FOR PROVIDING DECODED INFORMATION

FIELD OF THE INVENTION

The invention concerns an apparatus and a method for providing decoded information and especially an apparatus having a cache for storing and providing decoded information to an information recipient.

BACKGROUND OF THE INVENTION

As used herein, the word "information" is intended to include any type of data or instructions or both. As used herein, the words encode, encrypt, encipher, compressed and the words decode, decrypt, decipher and decompress, and related is forms, are intended to include any form of coding for any purpose, including, but not limited to obscuring meaning, compaction or compression to occupy less space or transmission time, or any other information technique. The words encode, encipher, encrypt, compress are intended to have the same meaning, and likewise for their inverse forms, e.g., decode, decipher, decrypt and decompress. For convenience of explanation, and without limiting the meaning of the terms "information" and "coded" as set above, the terms "instruction" and "coded" are used in the pages below.

There is a need to store instructions in coded form. This can arise because of a desire to make the instructions opaque to unintended users or to conserve memory space through some means of redundancy elimination or compaction coding or for other reason.

Storing instructions in coded form causes several problems, among which is the need to decode the instruction that is retrieved from the memory. When coded instruction must be refetched there is a need to decode it again, thereby causing a waste of time and degradation of apparatus performances.

In many computer apparatuses, these problems are more acute when a change of flow occurs. When a change of flow occurs instruction has to be fetched from the memory and decoded before being provided to a CPU of the computer apparatus.

A change of flow can occur for various reasons, such as an execution of an instruction that involves conditional or unconditional branching. A branch target instruction is the instruction that is fetched by the CPU when executing a branch instruction. The address of the branch target instruction is known as 'branch target address' and is a part of any branch instruction. In some instructions, such as the Isync instruction of the PowerPC microprocessor, the branch target address is predetermined, it is driven from the opcode alone.

This problem also arises when a branch prediction is erroneous. In such a case there is a need to refetch the instruction that follow the branch instruction.

The mentioned above waste of time and degradation of apparatus performances are especially acute in computer apparatuses that are supposed to handle very frequent changes of flow.

Another problem related to the storage of instructions in coded form is that the length of the instructions vary in a manner that the coded instructions are not aligned. Furthermore, a single coded instruction can be stored in a portion of a memory word or even in more than a single memory word.

There is a need to allow frequent changes of flow with minimum penalty. There is an ongoing need for improved computers and computer memory organization and operating methods which reduce or eliminate these and other well known limitations of the prior art.

BRIEF DESCRIPTION OF THE DRAWINGS

While the invention is pointed out with particularity in the appended claims, other features of the invention are disclosed by the following detailed description taken in conjunction with the accompanying drawings, in which:

DETAILED DESCRIPTION OF THE DRAWINGS

Figure 1:
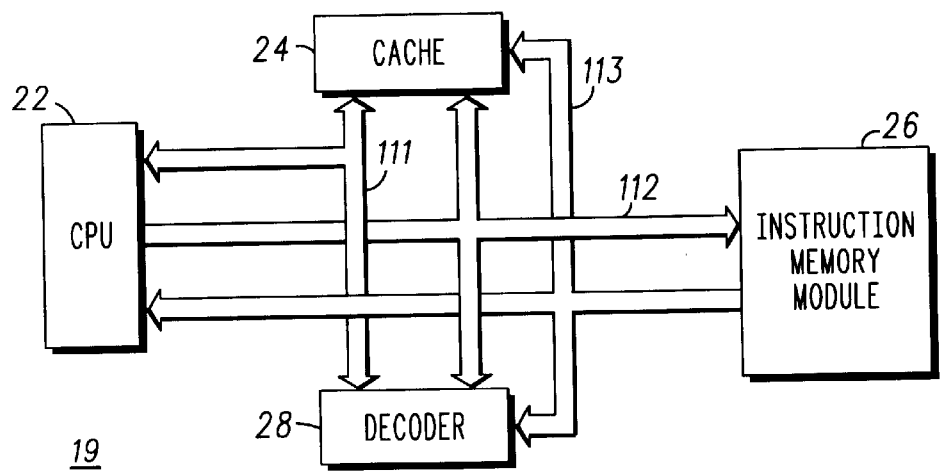
FIG. 1 is a simplified diagram of an apparatus and a processor, according to a preferred embodiment of the invention.

It should be noted that the particular terms and expressions employed and the particular structural and operational details disclosed in the detailed description and accompanying drawings are for illustrative purposes only and are not intended to in any way limit the scope of the invention as described in the appended claims.

The invention provides an apparatus and method for providing decrypted information, such as decoded instructions, the apparatus comprising: a memory module for storing decoded instructions; a decoder, coupled to the memory module, for fetching and decoding decoded instructions for providing decoded instructions; and a cache, coupled to the memory module and to the decoder and to a recipient of decoded instructions, the cache is adapted to store at least one set of decoded instructions, to be provided to the recipient of instructions after a cache check condition is fulfilled and a cache hit occurs.

Conveniently, the instructions are be executed by the recipient of information. The instructions are stored in a decoded form in the cache and are stored in a encoded form in the memory module and the recipient of instruction is a processing unit that is adapted to execute decoded instructions.

Conveniently, a cache check condition is fulfilled when a change of flow occurs. Optionally, a cache check condition is also fulfilled when an instruction out of a predetermined group of instructions is decoded by the decoder. Preferably, the group of instructions comprises a branch instruction that has a predetermined branch target address, such as Isync instruction and/or. A cache check condition can also be fulfilled when a branch prediction is erroneous.

The maximal length of the set of instruction is designed to answer various scenarios such as a worst case scenario in which the maximal length is designed so in a manner to allow the decoder to provide decoded instruction immediately after the cache provides the set of instruction. The maximal length can be shorter, to answer typical scenarios, so that in most cases the decoder is able to provide decoded instruction immediately after the cache provides the set of instruction Conveniently, the apparatus has an address translation mechanism for compensating for variance in length of decoded instruction. Preferably, this mechanism is adapted to provide the memory module at least one location of a memory word that stores at least a first portion of an instruction to be decoded by the decoder.

Conveniently, the cache comprising: a tag memory; a register file, for storing variables that define a status of at least one set of decoded instruction; a cache memory, for storing at least one set of decoded instruction; and a control unit, coupled to the tag memory, the register file and the cache memory, for controlling the provision and reception of instruction to and from the cache. Preferably, each instruction within the cache memory is accompanied by an address of the next instruction. The tag memory stores a plurality of decoded instructions, each being a first instruction out of a set of decoded instructions being stored in the cache memory.

For convenience of explanation it is assumed that the encoded instruction are decoded instructions and that a change of flow is a result of a branch.

FIG. 1 is a simplified block diagram of apparatus 20 coupled to processor/CPU 22, employing the present invention. Apparatus 19 comprising cache 24, instruction memory module 26 and decoder 28 coupled by control bus 111, instruction bus 1 12 and address bus 1 13. As explained in further details in accordance with FIGS. 2–6, cache 24 stores a plurality of decoded sets of instructions, each set starting with a branch target instruction. This arrangement allows the provision of decoded instructions when a change of flow occurs, while decoder 28 decodes encoded instructions to be provided after the set of instructions are provided by cache 24. Cache 24 provides instruction memory module 26 an address of at least a first portion of an encoded instruction that follows the last instruction of the set of instruction within cache 24. The portion and other consecutive portions of that instruction and consecutive instructions are fed to decoder 28 to be decoded and provided to CPU 22.

When a cache miss occurs, decoder 28 fetches the relevant encoded instruction from instruction memory module 26, decodes it and provides the branch target instruction and the following instructions to CPU 22 and to cache 24. Cache 24 stores the branch target instruction and a plurality of consecutive instructions.

In another embodiment of the invention cache 24 also stores at least one set of instructions that starts with an instruction that follows a branch instruction, so that if a branch prediction is erroneous cache 24 provides the instruction that follow the branch instruction. Decoder 28 notifies cache 24 when a branch instruction is decoded, and cache 24 reads the instructions that follow the branch instruction.

Conveniently, apparatus 19 is adapted to handle the problem of providing decoded instructions that vary in length. As explained in later details in accordance with FIGS. 2–6 apparatus 19 has an address translation mechanism that fetches the content of memory word to decoder 28 in a manner that all portions of an instruction are provided to decoder 28 before a decoded instruction is provided to CPU 22. An instruction that is stored in cache 24 in a decoded form INST(j,1) is accompanied by an address ADD(j,2) of the following instruction. This address is generated by decoder 28 during the decoding sequence and is provided to CPU 22. Conveniently, CPU 22 starts a read cycle by providing ADD(j) via bus 21 to cache 24 and decoder 28.

The depth of each set of instructions is designed to allow the provision of decoded instructions to CPU 24 while an instruction that follows the last instruction of the set is fetched from instruction memory module 25, decoded by decoder 28 and provided in a decoded form to CPU 22. The length can be set to answer various scenarios such as a worst case scenario or a typical scenario. For example, if a decoded instruction can be fetched from instruction memory module during one till three clock cycles and CPU 22 is provided with a decoded instruction at a following clock cycle then the length of the set of instruction can be adapted to provide decoded instructions during four clock cycles to answer the worst scenario.

Conveniently, cache 24 is relatively small and is fully associative, but these features are not necessary, so cache 24 can be large and/or be implemented as a direct map cache or as a set associative cache.

Figures 3, 4:
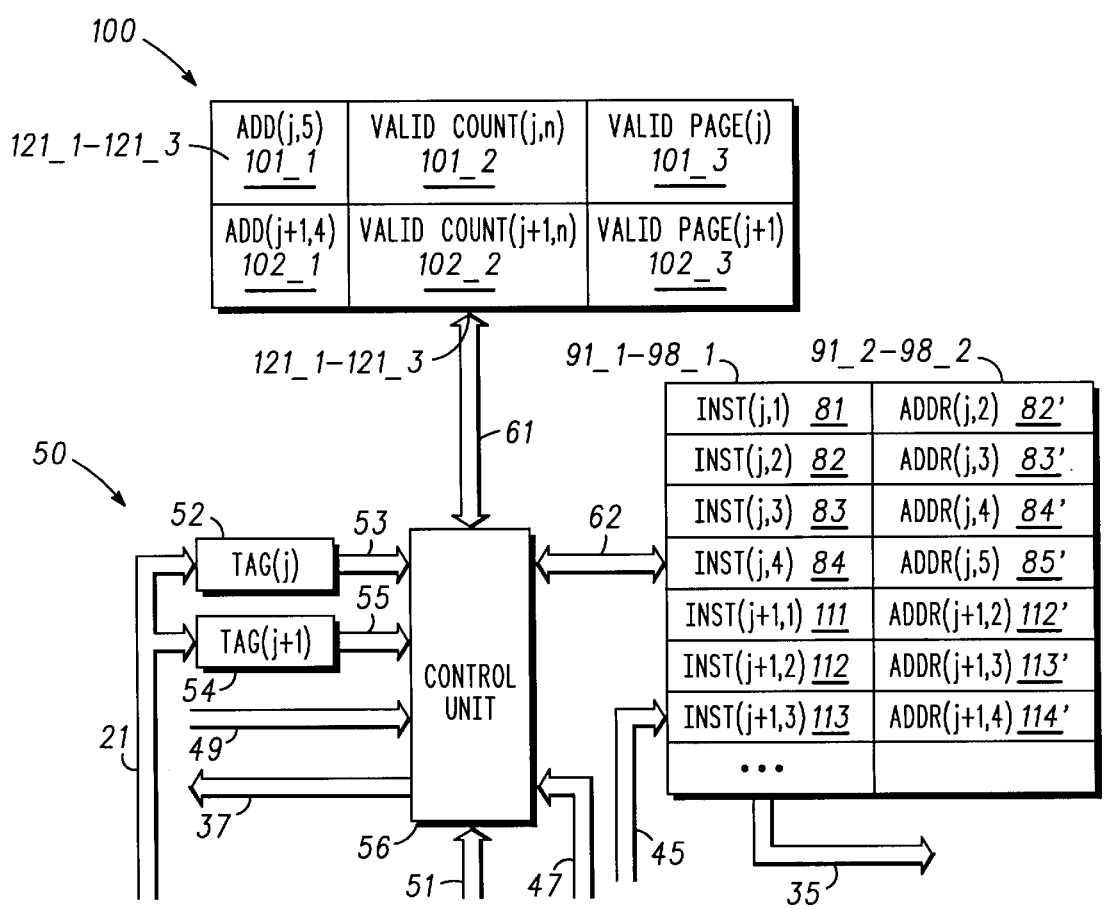
FIG. 3 is a schematic description of a portion of an instruction memory module of the apparatus of FIGS. 1–2, according to a preferred embodiment of the invention.
FIG. 4 is a simplified schematic diagram of a cache of the computer apparatus of FIGS. 1–2, according to a preferred embodiment of the invention.
Figure 5:
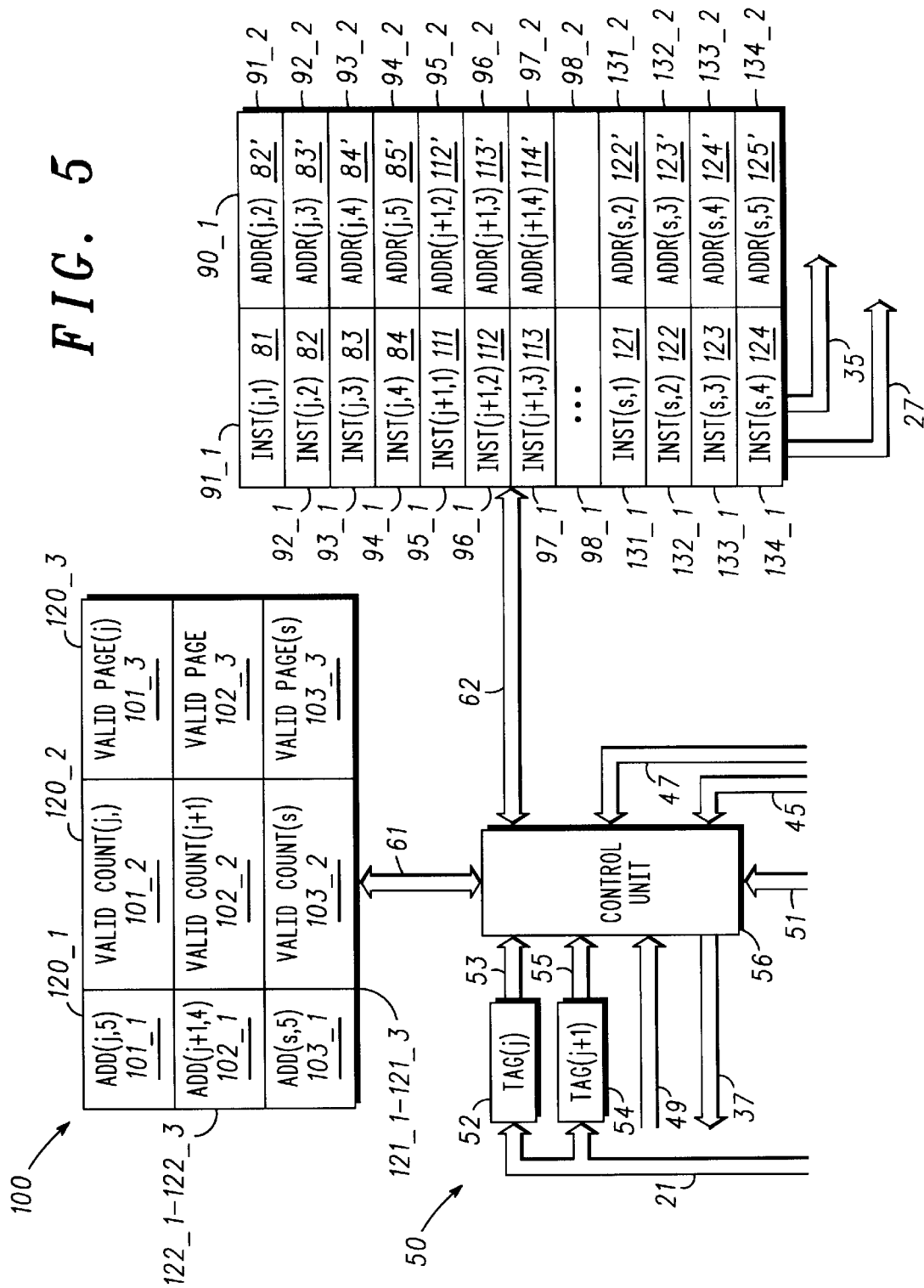
FIG. 5 is a simplified schematic diagram of the cache of the computer apparatus of FIGS. 1–2, according to another preferred embodiment of the invention.

FIG. 3 illustrates portion 261 of instruction memory module 26. Portion 261 comprises of six memory words 261__1–261__6 and stores eight encoded instructions C__INST(j,1)–C__INST(j,9) 71–79 whereas FIGS. 4–5 show that a j'th decoded set of instructions, starting with INST(j,1) is stored in cache 24. C__INST(j,2) has two portions C__INST(j,2,1) 72__1 and C__INST(j,2,2) 72__2. C__INST(j,8) has three portions C__INST(j,8,1) 78__1, C__INST(j,8,1) 78__2 and C__INST(j,8,3) 78__3. The encoded instructions vary at length and are stored in one till three memory words.

First memory word 261__1 stores C__INST(j,1) 71 and C__INST(j,2,1) 72__1. Second memory word 261__2 stores C__INST(j,2,2) 72__2, C__INST(j,3) 73 and C__INST(j,4) 74. Third memory word 261__3 stores C__INST(j,5) 75 and C__INST(j,6) 76. Fourth memory word 261__4 stores C__INST(j,7) 77 and C__INST(j,3,1) 78__1]. Fifth memory word 261__5 stores C__INST(j,8,2) 78__2. Sixth memory word 261__6 stores C__INST(j,8,3) 78__3 and C__INST(j,9) 72.

Figure 2:
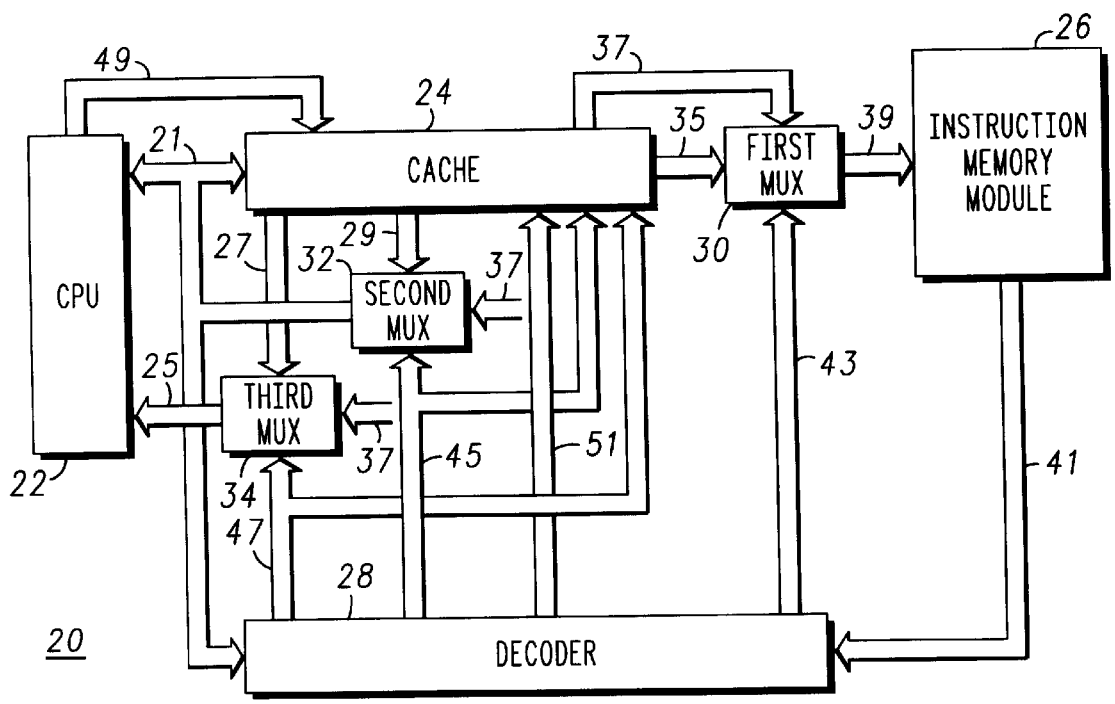
FIG. 2 is a schematic diagram illustrating an apparatus and a processor according to another preferred embodiment of the invention.

FIG. 2 is a simplified block diagram of apparatus 20 and CPU 22, employing the present invention. Apparatus 20 comprising cache 24, first multiplexer 30, instruction memory module 26, decoder 28, second multiplexer 32 and third multiplexer 34.

CPU 22 fetches decoded instructions and executes them. Instructions are stored in an encoded form in instruction memory module 26, and are provided to CPU 22 after being decoded. A decoded instruction can be provided to CPU 22 either by decoder 28 or by cache 24.

CPU 22 is coupled via bus 21 to cache 24 and decoder 28, for providing a current address ADD(n) of a current instruction INST(n) to be fetched to CPU 22 at current clock cycle CK(n). CPU 22 is coupled via line 49 to cache 24, for providing a control signal COF(n) that indicates that a change of flow occurs. When a change of flow occur a cache check condition is fulfilled. Cache snoops bus 21 and when a change of flow occur it compares ADD(n) to the content of at least a portion of tag memory 50 to determine if a cache hit occurred. After a cache miss, cache 24 snarfs lines 45 and 47 for receiving decoded instructions and addresses until the earliest event of the following two event occurs: (a) a set of decoded instructions starting with a branch target instruction that caused the cache miss is stored within cache 24; (b) another change of flow occurs. For example, FIGS. 4–5 show a (j+1)'th instruction set that comprises of three instructions, instead of four possible instructions. This can result from two changes of flow that are three clock cycles apart, wherein the first change of flow caused INST(j+1,1) to be stored in cache 24.

CPU 22 is coupled to second multiplexer 32 by bus 21 for receiving the next address ADD(n+1)—the address that follows address ADD(n). This next address can be provided by either cache 24 or decoder 28. CPU 22 is coupled to third multiplexer 34 by bus 25 for receiving INST(n). ADD(n+1) and INST(n) are provided by either cache 24 or by decoder 28.

When a change of flow occurs and CPU 22 requests to fetch instruction INST(n) it provides ADD(n) on bus 21 and sets COF(n) to indicate that a change of flow occurred. Cache 24 checks if it stores a valid INST(n). As seen in further detail in FIGS. 4–5 this check involves checking tag memory 50 for ADD(n) and checking register file 90 for indications of a validity of a selected instruction set. For convenience of explanation is assumed that ADD(n)=ADD(j,1) so that a cache hit occurs, cache 24 sets a HIT control signal and provides HIT via bus 37 to first to third multiplexers 30–34, causing them select buses 35, 29 and 27. Thus, cache 24 provides CPU 22 INST(j,1), ADD(j,2) and provides instruction memory module 26 with an address ADDR(j,5) (which equals 261_3) of encoded instruction C_INST(j,5) that follows the last instruction INST(j,4) of the j'th set of instructions. HIT is reset after I(j,4) is provided to CPU 22 by cache 24. As long as HIT is reset decoder 28 provides instructions and addresses to CPU 22 and instruction memory module 26.

FIGS. 4–5 are simplified schematic diagram of cache 24 according to two preferred embodiments of the invention.

Cache 24 comprises of tag memory 50, control unit 56, register file 100 and cache memory 90. FIGS. 4–5 show a portion of tag memory 50: tag registers and comparators 52 and 54, a portion 100_1 of register file 100 and a portion 90_1 of cache memory 90.

Tag registers and comparators TAG(j) 52 and TAG(j+1) 54 are coupled to bus 21 for receiving ADD(n) comparing it to ADD(j,1) and ADD(j+1,2) accordingly and providing signals that indicate if there is a match. The signals are provided via buses 53 and 55 to control unit 56. Control unit 56 is coupled to register file 120 via bus 61, to cache memory 90 via bus 62, to decoder 28 via buses 51, 47 and 45, to first to third multiplexers 30–34 via buses 37, and to CPU 22 via bus 49. Register file 120 is coupled to second multiplexer 32 via bus 29. Cache memory 90 is coupled to first multiplexer 30 via bus 35 and to third multiplexer 34 via bus 27.

ADD(j,1) and ADD(j+1,1) are associated with INST(j,1) and INST(j+1,1). Portion 90_1 stores the j'th and (j+1)'th sets of decoded instructions. The j'th set starting with INST(j,1) 81 and the (j+1)'th set starting with INST(j+1,1) 111. The j'th set comprises of INST(j,1) 81, INST(j,2) 82, INST(j,3) 83 and INST(j,4) 84 that are stores at memory portions 91_1, 92_2, 93_1 and 94_1 accordingly. INST(j,1)–INST(j,4) are associated with addresses ADD(j,2)–ADD(j,5) 82' till 85'. The (j+1)'th set of instructions comprises of INST(j+1,1) 111, INST(j+1,2) 112 and INST(j+1,3) 113 that are stores at memory portions 91_5, 91_6 and 91_7 accordingly. INST(j+1,1)–INST(j+1,1) are associated with addresses ADD(j+1,2)–ADD(j+1,4) 112' till 114'. ADD(j,2) 82' till ADD(j,5) 85' are stored in memory portions 92_1 till 92_4.

Each set of instructions is associated with three variables: a valid page variable, a valid count variable and a next address variable. Valid page variable indicates if a set of instructions contains valid instructions. Valid count variable indicates a number of instructions out of a set of instructions yet to be provided to CPU 22. For example, if a set of instructions has four valid instructions then after a first instruction of the set is provided to CPU 22, the valid count variable is set to 3. After a fourth instruction is provided to CPU 22 the variable is set to zero. The variable is set to four after HIT signal is reset, to indicate that four instructions can be provided when this set is refetched. Conveniently, HIT is set when a cache hit occurs and is reset when the valid count variable of the selected set equals zero.

Portion 100_1 of register file 100 comprises of memory words 101 and 102. Memory word 101 stores three variables that are associated with the j'th set of instructions: ADDR(j,5) 121_1, Valid count(j) 121_2 and valid page (j) 121_3. Memory word 102 stores three variables that are associated with the second set of instructions: ADDR(j+1,4) 122_1, Valid count(j+1) 122_2 and valid page (j+1) 122_3.

HIT is set by control unit 56 when all the following conditions are fulfilled: a cache check condition if fulfilled, ADD(n) matches one of the addresses stored within tag memory 50 and both valid page variable and valid count variables associated with the selected set of instructions indicate that the set comprises of at least one valid instruction.

For example, HIT is set when ADD(j+1,1)=ADD(n), COF(n) is set, valid page(j+1) 102_3 is set and valid count(j+1)>0. When HIT is set cache 24 provides INST(j+1,1) 111 from portion 95_1 of cache memory 90 to CPU 22, via bus 27 third multiplexer 34 and bus 25. Cache 24 provides ADDR(j+1,4) 102_1 to instruction memory module 26 so that at least first portion of encoded instruction C_INST(j+1,4) is provided to decoder 28, allowing the decoding of INST(j+1,5) to start while cache 24 provides INST(j+1,1) till INST(j+1,3) to CPU 22. ADD(j+1,2) is provided to CPU 22 via buses 29 and 21 and second multiplexer 32. Preferably INST(j+1,4) is provided to CPU 22 by decoder 28 at a clock cycle that follows a clock cycle in which INST(j+1,3) is provided to CPU 22 by cache 24. Valid count(j+1) initially equals 3 and is decreased whenever an instruction out of the (j+1)'th instruction set is provided to CPU 22.

Cache 24 of FIG. 5 has additional fields for storing a s'th set of instructions INST(s,1)–INST(s,4) 121–124 and variables ADD(s,5) 103_1, valid count(s) 103_2 and valid page(s) 103_3. The s'th set of instructions starts with an instruction INST(s,1) that follows a branch instruction INST(s,0) so that when a branch prediction associated with INST(s,1) is erroneous instructions INST(s,1)–INST(s,4) are provided to CPU 22 by cache 24, while INST(s,5) and instruction that follow it are decoded so that they are provided by decoder 28 to CPU 22 after INST(s,4) is provided by cache 24.

According to another preferred embodiment of the invention cache 24 also stores a set of instructions that starts with a predetermined branch target instruction.

Sets of instructions are written to cache 24 when a cache check condition is fulfilled but a cache miss occurs. In such a case, the branch target instruction and consecutive instructions that form a set of instructions are provided to both cache 24 and CPU 22 after being decoded by decoder 28. The writing process to cache 24 can be terminated by another change of flow.

Conveniently, each instruction is provided to cache 24 with an address of a next instruction. For example, if INST(j,1) causes a cache miss than INST(j,1) till INST(j,4) and addresses ADD(j,2) till ADD(j,5) are provided to cache 24 by decoder 28 during the clock cycles that follow the cache miss.

According to another embodiment of the invention, a set of instructions is written to cache 24 when a branch instruction is detected by decoder 51, so that if a branch prediction is erroneous cache 24 can provide a decoded set of instructions that follow the branch instruction. When decoder 28 detects that it decodes a branch instruction, it provided a control signal via bus 51 to control unit 56, that causes the instructions that are decoded after the branch instruction to be sent to cache 24.

Usually, some clock cycles lapse until a branch prediction is either confirmed or found to be erroneous, so that instructions that are decoded during these clock cycles are written to cache 24, along with a plurality of the addresses of the following instructions. The location of the new set of instructions can be determined according to well-known methods. A common method is to treat cache 24 as a first in first out queue.

According to another embodiment of the invention, instructions are written to cache 24 when a branch instruction to a predetermined branch target instruction occurs. For example, when decoder 28 senses that it decodes a Isync instruction that involves a branch to a consecutive instruction, it sends a control signal via bus 51 causing cache 24 to store a plurality of decoded instructions.

Figure 6:
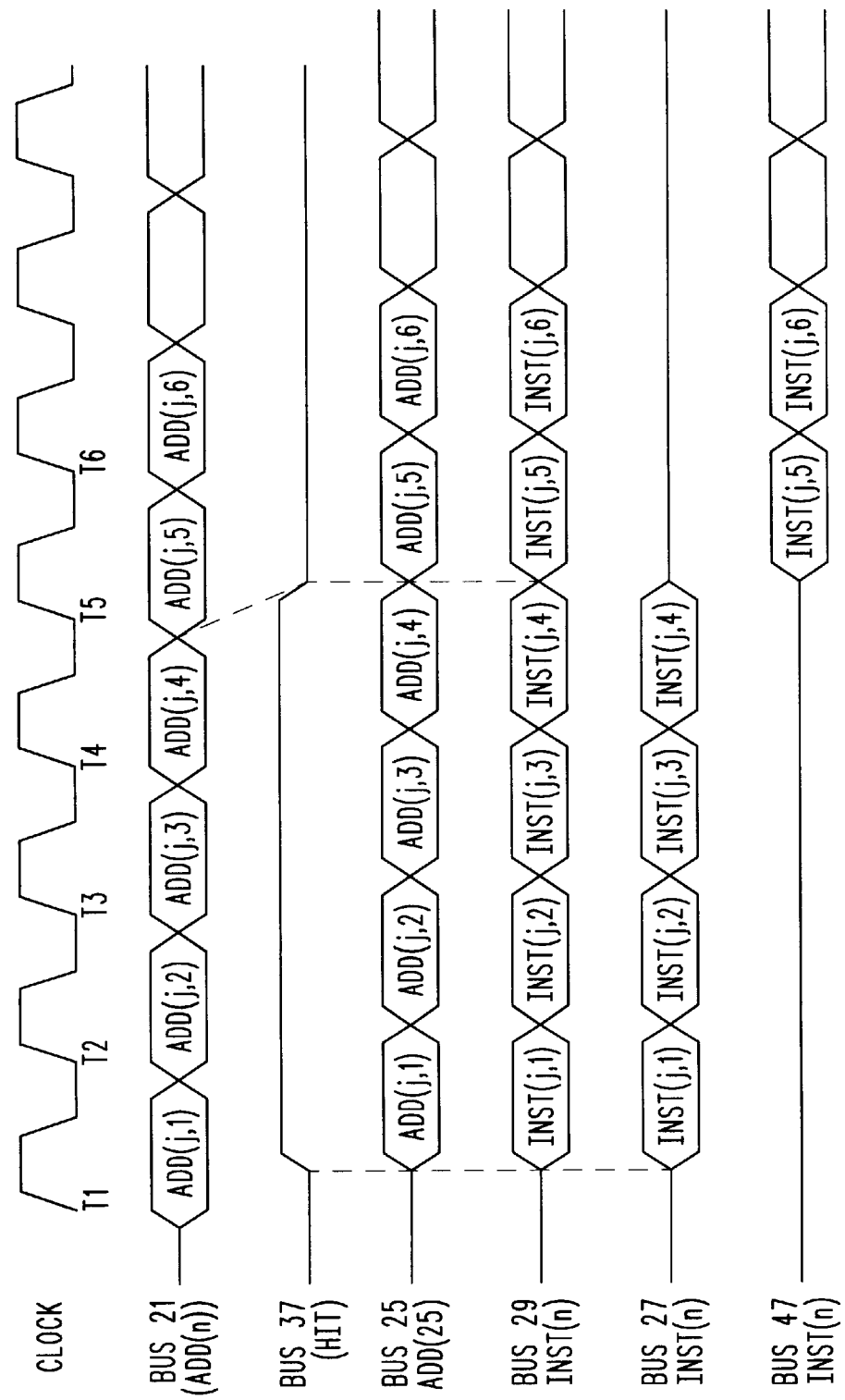
FIG. 6 is a simplified time diagram illustrating a provision of instructions by the cache of FIGS. 1–5, according to a preferred embodiment of the invention.

FIG. 6 is a simplified time diagram illustrating a provision of instructions by cache 24, according to a preferred embodiment of the invention. FIG. 6 shows the signals that appear at buses 21 27, 29, 37 and 35 during eight clock cycles, starting from time T1 to time T6. At T1 CPU 22 sets COF and provides ADD(j,1) at bus 21. TAG(j) 52 sends control unit 56 a signal indicating that a match occurred. Control unit 56 accesses register file 90 via bus 61 and reads memory word 100_1. Valid page(j) 101_3 indicates that instruction set (j) is valid, valid count(j) 101_2 is 4. Control unit 56 determines that a cache hit occurs, sets HIT and provides it to bus 37. Control unit 56 provides INST(j,1) to CPU 22 via bus 27 third multiplexer 34 and bus 25 and sets valid counts) 101_2 to three. At the next three clock cycles, starting at T2, T3 and T4 cache 24 provides INST(j,2), INST(j,3) and INST(j,4) to CPU 22. After all four instructions INST(j,1) –INST(j,4) are provided to CPU 22 control unit 56 resets HIT. At T5 and T6 decoder 28 provides CPU 22 with INST(j,5) and INST(j,6) that were decoded while HIT was set.

Figure 7:
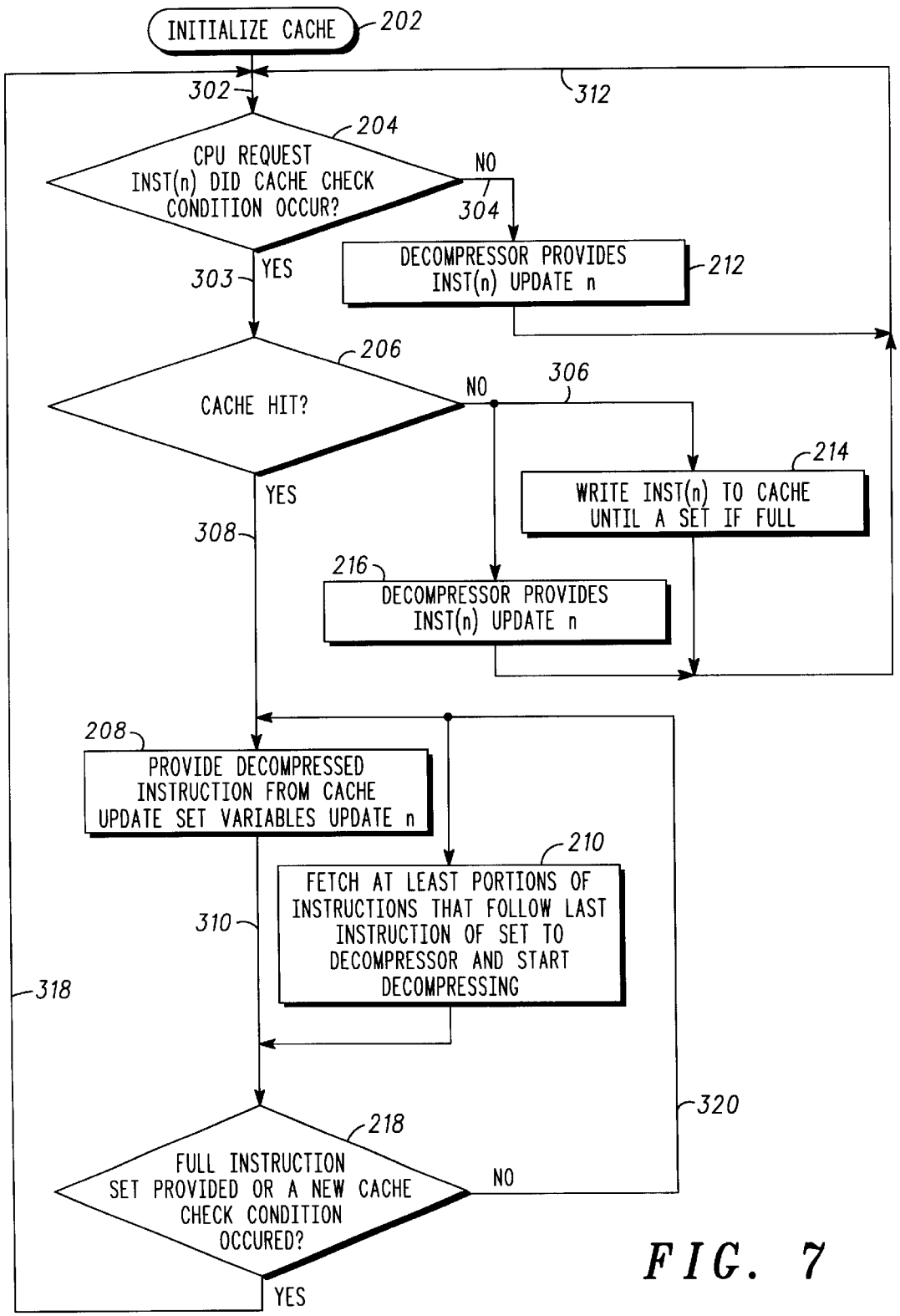
FIG. 7 is a flow chart of a method for storing and providing decoded instruction from and to a cache, according to a preferred embodiment of the invention.

FIG. 7 is a flow chart of a method 200 for providing decoded instruction to a cache. Preferably, method 200 comprises steps 202, 204, 206, 208, 210, 212, 214, 216 and 218, all steps illustrated by blocks. Solid lines 302, 303, 304, 306, 308, 310, 312, 318 and 320, couple steps 202 and 204, steps 204 and 206, steps 204 and 212, steps 206 and 214 and 216, steps 206, 208 and 210, steps 208, 210 and 218, steps 212, 214, 216 and 204, steps 218 and 204, steps 218, 208 and 210 accordingly. These paths indicate a preferred method flow.

Method 200 starts with step 202 of initializing cache 24. Usually, when cache 24 is initialized it does not store valid instructions so that the valid page, valid count and ADDR variables of all sets are reset. Step 202 is followed by step 204 of waiting for a request to fetch an instruction INST(n) and checking if a cache check condition is fulfilled.

During step 204 cache 24 snarfs address bus 21 and control buses such as 111, 49 and 51. Conveniently, a cache check condition is fulfilled when a change of flow occurs. Optionally, a cache check condition is fulfilled when a predetermined instruction, such as an Isync instruction, is decoded by decoder 28. In such a case control signal provided from decoder 28 via bus 51 indicate that such a predetermined instruction is decoded.

If a cache check condition is not fulfilled, step 204 is followed by step 212 of providing decoded instructions from decoder 28. Step 212 is followed by step 204.

If a cache check condition is fulfilled step 204 is followed by step 206 of checking if a cache hit occurred. If the answer if 'yes' step 206 is followed by steps 208, 210 and 218 in which at least a portion of a set of decoded instructions are provided by cache 24 while decoder 28 is provided with encoded portions of instructions that follow the said set and decodes the encoded instructions. Steps 208 of providing decoded instructions from cache and updating set variables and 'n' and step 210 of fetching at least portions of instructions to decoder 28 and decoding the said instructions are followed by step 218 that guarantees that steps 210 and 208 are repeated until the earliest event of the following events occurs: (a) a full set of instructions is provided by cache 24; (b) a new cache check condition is fulfilled.

If the answer is 'no' step 206 is followed by steps 214 and 216 of providing decoded instructions to CPU 22 and to cache 24 by decoder 28. The instructions are written to cache 24 until a full set of instructions is written to cache 24.

It should be noted that the particular terms and expressions employed and the particular structural and operational details disclosed in the detailed description and accompanying drawings are for illustrative purposes only and are not intended to in any way limit the scope of the invention as described in the appended claims.

Thus, there has been described herein an embodiment including at least one preferred embodiment of an apparatus having a cache for providing decrypted information to an information recipient and an apparatus thereof. It will be apparent to those skilled in the art that the disclosed subject matter may be modified in numerous ways and may assume many embodiments other than the preferred form specifically set out and described above.

Accordingly, the above disclosed subject matter is to be considered illustrative and not restrictive, and to the maximum extent allowed by law, it is intended by the appended claims to cover all such modifications and other embodiments which fall within the true spirit and scope of the present invention. The scope of the invention is to be determined by the broadest permissible interpretation of the following claims and their equivalents rather than the foregoing detailed description.

We claim:

1. An apparatus for providing decoded information, the apparatus comprising:

a memory module for storing encoded information;

a decoder, coupled to the memory module, for fetching and decoding encoded information and for providing decoded information; and a cache, coupled to the memory module and to the decoder and to a recipient of decoded information, the cache being adapted to store at least one set of decoded information, to be provided to the recipient of information after a cache check condition is fulfilled and a cache hit occurs, wherein the maximal length of the set of information is designed so that the decoder provides decrypted information immediately after the cache provides the set of information.

2. The apparatus of claim 1 wherein the information is instructions to be executed by the recipient of information.

3. The apparatus of claim 2 wherein the instructions are stored in a decoded form in the cache and are stored in an encoded form in the memory module and the recipient of information is a processor that is adapted to execute decoded instructions.

4. The apparatus of claim 1 wherein a cache check condition is fulfilled when a change of flow occurs.

5. The apparatus of claim 4 wherein a cache check condition is also fulfilled when an instruction out of a predetermined group of instructions is decoded by the decoder.

6. The apparatus of claim 5 wherein the group of instructions comprises a branch instruction that has a predetermined branch target address.

7. The apparatus of claim 1 wherein the cache check condition is fulfilled when a branch prediction is erroneous.

8. The apparatus of claim 1 wherein the apparatus has an address translation mechanism for compensating for variance in length of decrypted information.

9. The apparatus of claim 8 wherein the address translation mechanism is adapted to provide the memory module at least one location of a memory word that stores at least a first portion of an information to be decoded by the decoder.

10. The apparatus of claim 1 wherein the cache is fully associative.

11. The apparatus of claim 1 wherein the cache comprising:

a tag memory;

a register file, for storing variables that define a status of at least one set of decrypted information;

a cache memory, for storing at least one set of decrypted information; and a control unit, coupled to the tag memory, the register file and the cache memory, for controlling the provision and reception of information to and from the cache.

12. The apparatus of claim 11 wherein the information within the cache memory is accompanied by an address of the next information.

13. The apparatus of claim 12 wherein the tag memory stores a plurality of decoded instructions, each being a first instruction out of a set of decoded instructions being stored in the cache memory.

14. A method for providing decoded information comprising the steps of:

initializing a cache;

receiving a request to provide information to a recipient of information; and checking if a cache condition is fulfilled and providing an answer;

(a) providing the recipient of information decoded information from a decoder and jumping to step of checking if a cache condition is fulfilled, if the answer is 'no';

(b) checking if a cache hit or a cache miss occurs, if the answer is 'yes';

(1) updating cache until a full set of instructions starting with an instruction that caused the cache miss is stored in cache, providing recipient of information decoded information from the decoder, if a cache miss occurs; and (2) jumping to step of checking if a cache miss occurred; providing decoded information from cache to recipient of information; providing encoded information that follow decoded information stored in cache to decoder; decoding the encoded information; repeating step (2) until providing a full set of instructions starting with an instruction that caused the cache hit or a new cache check condition is fulfilled;

jumping to step of checking if a cache miss occurred, wherein the maximal length of the set of instructions is designed so that the decoder provides decrypted information immediately after the cache provides the set of instructions.

15. The method of claim 14 wherein the information is instructions to be executed by the recipient of information.

16. The method of claim 15 wherein the instructions are stored in a decoded form in the cache and are stored in a encoded form in a memory module that is coupled to the cache and to the decoder; and wherein the recipient of information is a processor that is adapted to execute decoded instructions.

17. The method of claim 14 wherein a cache check condition is fulfilled when a change of flow occurs.

18. The method of claim 17 wherein a cache check condition is also fulfilled when an instruction out of a predetermined group of instructions is decoded by the decoder.

19. The method of claim 18 wherein the group of instructions comprises a branch instruction that has a predetermined branch target address.

20. The method of claim 14 wherein the cache check condition is fulfilled when a branch prediction is erroneous.

21. The method of claim 14 wherein step (b) involves translating addresses for compensating for variance in length of decrypted information.

\* \* \* \* \*